July 5, 1949.  E. E. PENDLETON ET AL  2,475,459
BELT INSTALLING TOOL
Filed June 12, 1947

Ernest E. Pendleton, &
Houston C. League
INVENTORS,

BY
Bernard P. Miller
ATTORNEY

Patented July 5, 1949

2,475,459

UNITED STATES PATENT OFFICE 2,475,459

BELT INSTALLING TOOL

Ernest E. Pendleton, Oklahoma City, Okla., and Houston C. League, Joplin, Mo., assignors of one-sixth to Charles E. Ziegler, Sapulpa, Okla., and one-sixth to Ira E. Dissinger, Joplin, Mo.

Application June 12, 1947, Serial No. 754,212

4 Claims. (Cl. 74—242.7)

Our invention relates to tools for installing belts upon pulleys, and more particularly to a tool for installing a V-belt over a V-notched pulley.

The principal object of the invention is to provide a tool which may be manually operated safely, to install an endless V-belt, or endless drive rope, over a peripherally grooved drive pulley, while the pulley is being driven to rotation.

Most V-belts have little elasticity, and since they must operate in fairly deep grooves in the pulleys which they envelope, it is almost impossible to manually stretch such belts sufficiently to install them about the two pulleys.

At the present time, it is common practice to accomplish such installation by one of two methods.

The first, and safest method, is to so mount one of the pulleys that it may be moved toward and away from the other pulley. This method occasions the necessity of either loosening and then tightening take-up bearings, or loosening anchor bolts on the machine which carries one of the pulleys.

The other, and most commonly used method, is to pry the belt into place upon the rotating drive pulley by the use of a pry-bar. This latter method is extremely dangerous to the person making the installation.

The present invention somewhat simulates this latter method, but the present tool eliminates the usual danger to life and limb which the method occasions.

Another object is to provide a tool of this class in which moving or operating parts have been reduced to a minimum.

A further object is to provide a tool which requires no particular skill or training to operate safely and successfully.

An additional object is to provide a tool which is strong, durable, and which is comparatively cheap to manufacture.

Other objects will be apparent from the following description when taken in conjunction with the accompanying one sheet of drawings, wherein.

Like characters of reference designate like parts in those figures of the drawings in which they occur.

In the drawings.

Figure 1:
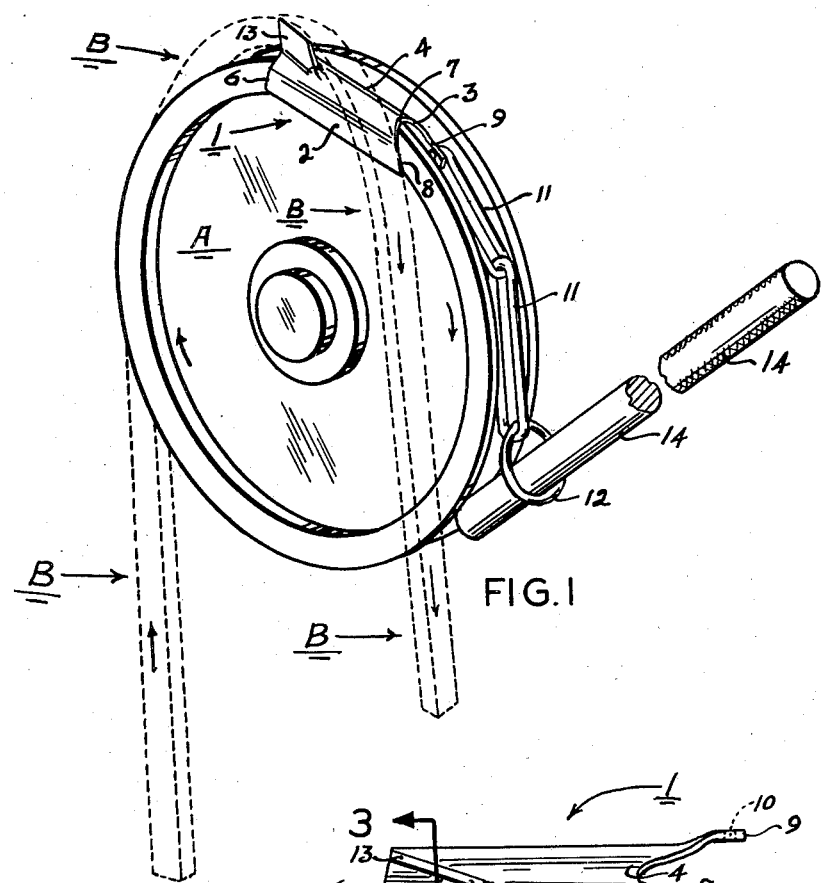
Figure 1 is a perspective view of the tool of the present invention operatively installed for use upon a pulley, the belt being shown in dotted lines.

The reference character A indicates, as a whole, a usual V-belt drive pulley, and B indicates a V-belt which is being installed over the pulley A and within the peripheral groove thereof.

Figure 3:
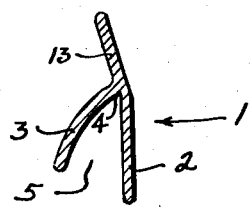
Figure 3 is a sectional view taken substantially along the line 3—3 of Fig. 2.

The device of the present invention consists substantially of a belt guiding member 1 which is of rigid construction, preferably being made of stainless steel. In cross-section, the member or body 1 is substantially V-shaped, having two depending flanges 2 and 3 which converge, and which are integrally united along their common longitudinal line 4 of convergence (Fig. 3). The outside flange 2 is substantially straight vertically, while the inside flange 3 is slightly arcuate and extends away from the flange 2 to provide therebetween a flared notch or groove 5.

Figure 2:
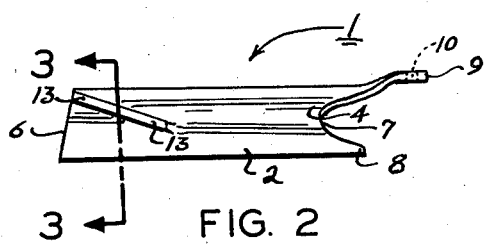
Figure 2 is a top view of the belt guiding element.

Longitudinally, the flanges 2 and 3 are co-extensive from their left hand ends 6 (Fig. 2) to a point 7 in their common longitudinal line of convergence. The extreme right hand ends of the flanges 2 and 3 extend longitudinally beyond the point 7 to form respective prongs 8 and 9. The prong 9, adjacent its right hand end, has a transverse perforation 10 which receives the left hand end link of a chain 11, the other end link of which is connected to a ring 12. The office of the member 1, chain 11 and ring 12 will be more fully described hereinbelow.

Adjacent the left hand end 6 of the body 1, and diagonally transversing the longitudinal line 4 of convergence of the flanges, the body is provided with an integral upstanding blade or web 13, which is also of rigid construction.

In operation, the body 1 is placed upon a flange of the pulley A, with the flange 3 lying within the peripheral groove of the pulley, and with the prong 9 thereof pointing in the direction of rotation of the pulley. When in such a position, the chain 11 lies within the pulley groove, and the upstanding blade 13 lies in a position to diagonally traverse that pulley flange upon which the body is disposed.

The endless belt B is first looped beneath a driven pulley, not shown, and its upper portion is then loosely placed in the rearmost portion or extent of the pulley groove. The upper loop portion of the belt is then passed over the body 1 in front of the blade 13. One end of a pry-bar or rod 14 is then grasped in the hand of the operator, and its other end is inserted through the ring 12 into the pulley groove at a point below center of the pulley.

The outer end of the pry-bar is then pressed downwardly, thus moving the body 1 and blade 13 along the pulley, in its direction of rotation, and therefore tightening the belt B over the upper extent of the pulley. As the outer end of the pry-bar 14 is moved farther in a downward direction, the blade 13 forces the upper loop portion of the belt to thread into the upper portion of the pulley groove.

When a sufficient portion of the belt B has thus been placed in frictional engagement with the pulley, the friction will cause the belt to be run onto the pulley within its peripheral groove.

It is pointed out that the body 1 and blade 13 actually constitute a runner which always moves in front of the forwardmost point of contact of the belt with the pulley groove. The body 1 cannot, therefore, become fouled between the belt and the peripheral surface of the pulley.

Since the operator's hand is at no time, during the belt installing operation, in close proximity with the pulley, not in a position in which it may be fouled with the belt, injurious accidents are eliminated.

The tool, of course, may be used in a similar manner for installing belts upon pulleys which lie in horizontal alignment with each other. A flexible member, such as a cable, could of course be used in lieu of the chain 11.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A tool for guiding an endless belt into operative engagement with the driving one of two peripherally grooved and aligned pulleys, including: a runner adapted to slidably straddle one peripheral flange of said driving pulley; an upstanding blade carried by the runner and disposed at an angle to traverse said pulley flange for guiding a belt thereover; and manually actuated means for moving said runner along said flange, whereby the belt is guidably forced into said groove.

2. A tool for guiding an endless belt into operative engagement with the driving one of two peripherally grooved and aligned pulleys, including: a runner adapted to slidably straddle one peripheral flange of said driving pulley; belt engaging means rigidly projecting from said runner; a flexible element attached to one end of said runner and adapted to lie in the peripheral groove of said pulley; and a ring attached to the free end of said element for receiving a pry-bar.

3. A tool for guiding an endless belt into operative engagement with the driving one of two peripherally grooved and aligned pulleys, including: a rigid elongated guide member having substantially V-shaped cross-sectional configuration, said member adapted for slidable installation in straddling relation upon one peripheral flange of said driving pulley; a rigid blade extending upwardly from said member in a position to diagonally traverse said pulley flange; a flexible element attached to one end of said member in position to lie in the peripheral groove of said pulley; and a ring attached to the free end of said element for receiving a pry-bar.

4. Structure as specified in claim 1, in which the last mentioned means includes: a flexible element attached to one end of said runner and adapted to lie in the peripheral groove of said pulley; and a ring attached to the free end of said element for receiving a pry-bar.

ERNEST E. PENDLETON.
HOUSTON C. LEAGUE.

REFERENCES CITED

The following references are of record in the file of this patent:

UNITED STATES PATENTS

| Number | Name | Date |
|---|---|---|
| 1,318,727 | Cohn | Oct. 14, 1919 |
| 2,121,129 | Malone | June 21, 1938 |
| 2,333,395 | Smith | Nov. 2, 1943 |